US005593225A

United States Patent [19]

Safyan

[11] Patent Number: 5,593,225

[45] Date of Patent: Jan. 14, 1997

[54] WALL WASHER LIGHT WITH INTERNAL SWIVEL CONNECTOR AND SUPPORT ARM

[75] Inventor: Bernard Safyan, Los Angeles, Calif.

[73] Assignee: CCC Industries, LLC, Wrentham, Mass.

[21] Appl. No.: 490,852

[22] Filed: Jun. 15, 1995

[51] Int. Cl.[6] .......... F21S 3/02

[52] U.S. Cl. .......... 362/427; 362/218; 362/220; 362/223; 362/371; 362/414

[58] Field of Search .......... 362/125, 126, 362/218, 220, 223, 370, 371, 410, 413, 414, 418, 421, 427

[56] References Cited

U.S. PATENT DOCUMENTS

| | | | |
|---|---|---|---|
| 2,740,885 | 4/1956 | Kruger | 362/220 |
| 4,528,618 | 7/1985 | Bitsch | 362/220 |
| 4,949,232 | 8/1990 | Safyan | 362/218 |
| 5,093,767 | 3/1992 | Burn | 362/125 |
| 5,113,328 | 5/1992 | Foster et al. | 362/223 |
| 5,437,504 | 8/1995 | Halvatzis | 362/220 |
| 5,479,327 | 12/1995 | Chen | 362/218 |

*Primary Examiner*—Ira S. Lazarus
*Assistant Examiner*—Alan B. Cariaso
*Attorney, Agent, or Firm*—Philip D. Junkins

[57] ABSTRACT

A pivoted head lighting device for illuminating exhibit and display panels, display objects and work surfaces with substantially uniform spot-free spread of light. The device includes an elongated metal shell structure having an upper corner transition section and a lower front opening bearing a glass lens, a high intensity electric lamp tube positioned centrally within the shell structure, an elongated concave metallic light reflector within the shell structure between the lamp tube and upper corner transition section thereof, and an elongated support arm pivotally interconnected to the shell structure. The upper transition section includes integral internally-projecting tube gripping lip sections of semicircular configuration for holding a terminal cross-tubular swivel member for adjustable rotation therein. The internal cross-tubular swivel member is interconnected to an end of the support arm. The external diameter of the swivel member and the internal diameter of the gripping lip sections are substantially equal whereby rotation of the swivel member within the gripping lip sections to position the pivoted head of the lighting device and the light illumination therefrom is only accomplished by overcoming the rotation friction resistance between the swivel member and the internally-projecting tube gripping lip sections of the upper transition section of the shell structure.

9 Claims, 1 Drawing Sheet

3
26a
26
18a
26b
18b
22a
26c
31
22b
44
14
14a
20
12
34
22
31
40
18a
24b
24
36
32
28b
24a
18b
30b
30
28
30a
42
28a
3

WALL WASHER LIGHT WITH INTERNAL SWIVEL CONNECTOR AND SUPPORT ARM

BACKGROUND OF THE INVENTION

The present invention relates to lighting fixtures which may be utilized to illuminate exhibits and displays. More particularly, the invention relates to lighting fixtures which produce a washed lighting effect in that they do not produce concentrated light spots with surrounding dark areas but provide substantially uniform lighting of wall displays or exhibit wall areas. Further, the invention relates to lighting fixtures which are pivotally mounted to wall brackets and support arms.

Classically, exhibit and display lighting has been accomplished by the use of spot lights with the incandescent light source surrounded by a metallic canister-type enclosure. Such lighting devices are heavy and must be appropriately vented for convection air circulation so that they do not become over heated. Attempts have been made to fabricate spot lights and other display illuminating devices of plastic materials but such lights and devices have failed to pass Underwriter Laboratory certification because the common plastic materials of fabrication become charred, burn or melt under the heat generated by the enclosed light emitting source. Even vented head, molded thermoplastic light fixtures, with an inner reflector, have been found to generate such great heat as to be unsafe. To solve the objectives of exhibit and display lighting fixtures of light-weight construction, having heat dissipation characteristics, and providing uniform or washed lighting over wide areas, the present inventor constructed and patented exhibit and display lighting devices as shown and described in U.S. Pat. No. 4,949,232 entitled "Wall Washer Exhibit Light With Heat Dissipation Reflector." The lighting devices disclosed and claimed in U.S. Pat. No. 4,949,232 have proven to be most acceptable but have led to the need for additional improvements in such devices, particularly with respect to simplicity of construction and the means provided for readily adjusting the orientation of the lighting head structure with respect to the display or exhibit subject matter to be illuminated.

It is an object of the present invention to provide an exhibit or display lighting device of light weight metallic construction with provision for adequate heat dissipation and including unique internal swivel connection means between the lighting head structure and the supporting arm for the device.

It is a further object of the invention to provide an exhibit or display lighting device having a head structure shell formed of light weight extruded aluminum with integral means for unique internal swivel connection of the head structure to the supporting arm for the device.

It is a still further object of the invention to provide an exhibit or display lighting device having a head structure which is readily adjustable in its orientation for the projection of spot-free illumination onto exhibit and display panels and objects.

Other objects and advantages of the invention will become apparent from the following summary and detailed descriptions of a preferred embodiment of the invention taken in conjunction with the accompanying drawing figures.

SUMMARY OF THE INVENTION

The present invention relates to an improved exhibit or display lighting device which provides a washed or substantially uniform lighting effect over broad areas requiring illumination and which includes a head structure which may be easily adjusted with respect to its light projecting orientation onto exhibit and display panels or objects to be illuminated. The lighting device of the invention includes as its principal item of head structure a light weight extruded aluminum casing of somewhat arcuate configuration. The head structure casing is provided, in its upper corner transition section, with an integral internally-projecting, elongated semi-circular, tube-gripping means for holding (in adjustable rotational fashion) a terminal cross-tubular pivot member of the supporting arm for the lighting device. The external diameter of the cross-tubular member and the internal diameter of the semi-circular tube-gripping means are substantially identical so that when the tubular member is seated within the gripping means, as described hereinafter, adjusting rotation of the tubular member is only possible by overcoming friction resistance between such member and means.

The semi-circular, tube-gripping means of the head structure casing has a forward arcuate lip portion and a rearward arcuate lip portion with the open annular space between such lips covering slightly less than 180 circular degrees. Thus, the cross-tubular swivel member of the support arm must be force snapped into the tube-gripping means during assembly of the lighting head structure and such pivot member thereafter is retained in the tube-gripping means for adjusting rotation therein against the friction fitment between such member and means. The rear descending surface of the extruded aluminum casing of the lighting head structure includes a central open slot area through which the forward end of the supporting arm of the lighting device extends and interconnects with the cross-tubular swivel member after the latter has been seated in the tube-gripping means during the assembly of the lighting device. The extended rear end of the supporting arm of the lighting device bears a clamping device or bracket of known design for affixing the lighting device of the invention to an exhibit wall or other exhibit structure. The casing of the lighting head structure, forward of the upper corner transition section, includes a series vents for dispersing heat that is built up within the head structure during lighting operation of the lighting device.

In addition to the extruded aluminum casing, as described above, the lighting head structure of the present invention includes: a high intensity light source (such as an elongated halogen lamp), an arcuate metallic reflector interposed between the light source and the head Structure casing, a tempered glass shield or lens to protect the lamp, and end closure walls. The glass shield or lens extends across the casing from the lower front edge section thereof to the lower rear edge section thereof and over the length of the head structure. The end walls of the head structure are affixed by screw fasteners to the ends of the extruded casing and such walls each internally bear a ceramic (insulating) support fixture for receiving and maintaining one end of the enclosed high intensity halogen type light tube or lamp.

BRIEF DESCRIPTION OF THE DRAWING FIGURES

Figures 1, 2, 3, 4:
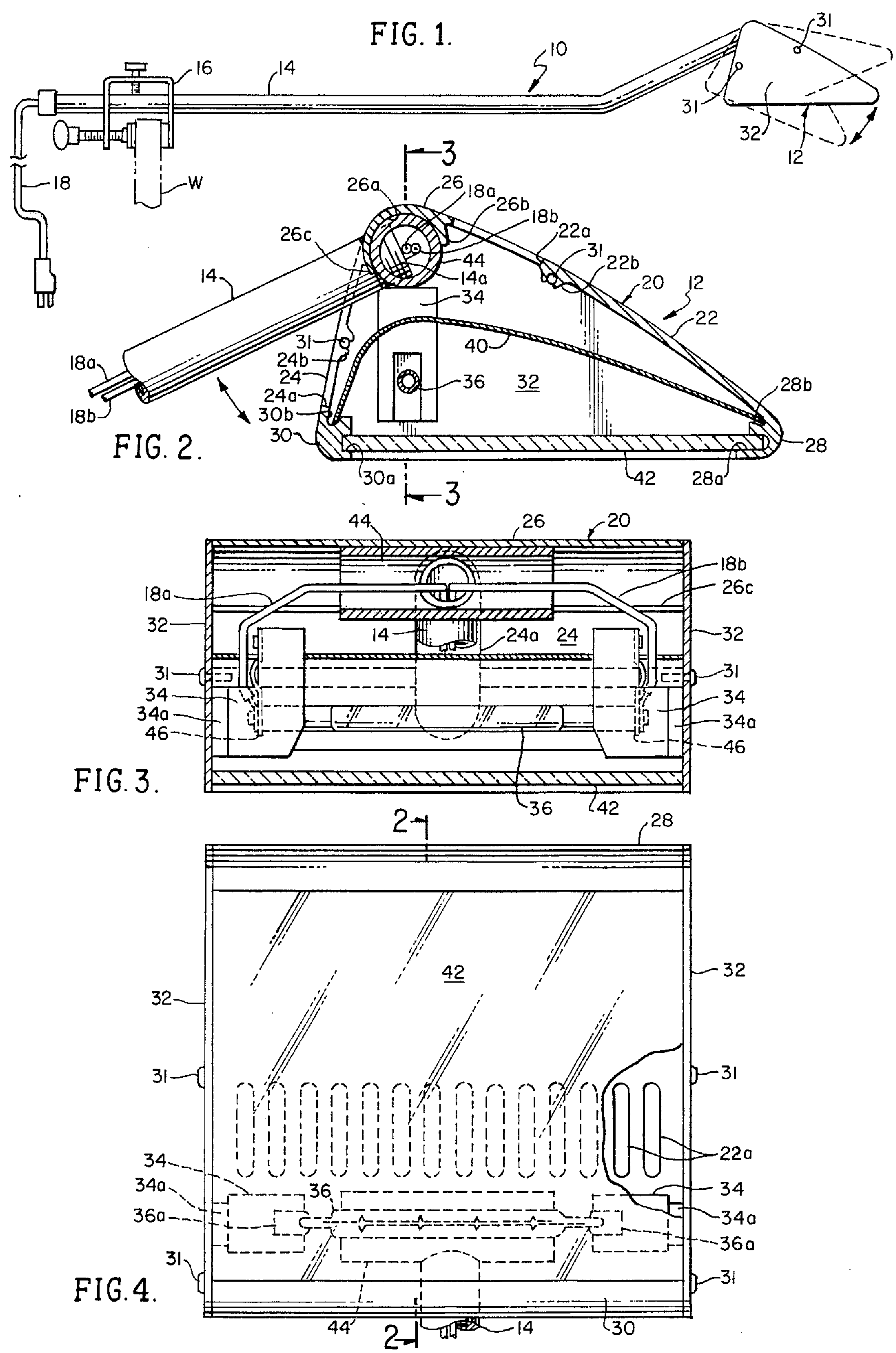
FIG. 1 is a side view of the lighting device of the present invention with the lighting head structure thereof mounted via a support arm and bracket to the upper edge of an exhibit wall.
FIG. 2 is a section view of the lighting head structure of the lighting device of the invention taken on line 2—2 of FIG. 4.

FIG. 3 is a section view of the lighting head structure of the lighting device taken on line 3—3 of FIG. 2; and FIG. 4 is an upward view of the lighting head structure of the lighting device of FIGS. 1 and 2 toward the bottom glass lens thereof, such view shoeing the head structure rotated ninety degrees from its position as shown in FIGS. 1 and 2.

DETAILED DESCRIPTION OF THE INVENTION

Referring now to the drawing figures, there is shown in FIG. 1 a side view of an entire lighting device 10, in accordance with the present invention, including a lighting head structure 12, tubular supporting arm 14 (pivotally affixed to the head structure as described hereinafter), and a clamping device 16 (adjustably mounted to the supporting arm) for affixing the lighting device in forwardly projecting fashion from the upper edge of an exhibit or display wall "W" (shown in phantom outline). A power cord 18 projects through the tubular supporting arm 14 to the lighting head structure 12.

In FIGS. 2, 3 and 4 there is shown in detail a preferred embodiment of the lighting head structure 12 of the invention and the unique means for its pivotal attachment to the supporting arm 14. FIG. 2 comprises a section view of the lighting head structure 12 of the lighting device 10 taken on line 2—2 of FIG. 4, FIG. 3 is a section view of the lighting head structure 12 taken on line 3—3 of FIG.2, and FIG. 4 is an upward view of the lighting head structure 12 toward the bottom glass lens thereof, such view showing the head structure rotated ninety degrees from its position as shown in FIGS. 1 and 2. A principal component of the head structure 12 is a light weight extruded aluminum casing 20 of somewhat arcuate configuration in its cross section (see particularly FIG. 2). The casing 20 includes a forwardly and downwardly projecting upper front wall section 22 and a rearwardly and downwardly projecting upper rear wall section 24 which are joined in an upper corner transition section 26.

The head structure casing 12 is provided over its length, in its upper corner transition section 26, with an integral internally-projecting tube gripping means which has an internal semi-circular surface 26*a* for holding (in adjustable rotational fashion) a terminal cross-tubular swivel member 44 of the supporting arm 14 of the lighting device. The external diameter of the cross-tubular member 44 and the internal diameter of the semi-circular tube gripping means are substantially identical so that when the cross-tubular member 44 is seated within the gripping means, as described hereinafter, adjusting rotation of the tubular member is only possible by overcoming friction resistance between such member and the gripping means.

The semi-circular tubular-gripping means of the head structure casing has a forward arcuate lip portion 26*b* and a rearward arcuate lip portion 26*c* with the open annular space between such lips covering slightly less than 180 degrees. Thus, the cross-tubular swivel member 44 of the support arm must be force snapped into the tube-gripping means (through the open annular space between lip portions 26*b* and 26*c*) during assembly of the lighting head structure and such swivel member thereafter is retained by such lip portions in the tube-gripping means for adjusting rotation therein against the friction fitment between such member and means.

The forwardly and downwardly projecting upper front wall section 22 of the lighting head structure 20 of the lighting device 10 includes a series of vent slots 22*a* (see particularly FIGS. 2 and 4) for convection release of heat from the head structure. The rearwardly and downwardly projecting upper rear wall section 24 of the head structure includes a central open slot 24*a* (see particularly FIGS. 2 and 3) through which the forward end of the supporting arm 14 of the lighting device 10 extends and interconnects via its threaded end portion 14*a* with a mating threaded opening at the mid-portion of cross-tubular swivel member 44.

The downwardly projecting front wall section 22 of the head structure casing 20 terminates in a front edge section 28 which includes an outer (lower) longitudinal groove 28*a* and an inner (upper) longitudinal groove 28*b*. In like fashion the downwardly projecting rear wall section 24 of the casing terminates in a rear edge section 30 which includes an outer (lower) longitudinal groove 30*a* and an inner (upper) longitudinal groove 30*b*. The inner (upper) longitudinal grooves 28*b* and 30*b* cooperate to support within the lighting head structure 12 the internal arcuate metallic reflector unit 40 of the head structure. The outer (lower) longitudinal groove cooperate to support across the lower face of the lighting head structure 12 the tempered glass shield or lens 42 which protects the elongated halogen lamp 38 which spans the length of the space within head casing 20 between the reflector unit 40 and the protective lens 42.

The extruded metallic casing 20 of the lighting head structure 12 is closed at each of its ends by end walls 32 which take the peripheral shape of the casing 20 (see particularly FIG. 1). The end walls are mounted to casing 20 via machine screw fasteners 31 which thread into the threaded end portions of channels 22*b* and 24*b* which are formed, respectively, on the inner surfaces of front wall section 22 and rear wall section 24 of the casing. Mounted to the inner side of the end walls 32 are ceramic (insulating) lamp support fixtures 34 which are affixed thereto via their respective mount blocks 34*a*. The high intensity halogen lamp or light tube 38 is retained within the ceramic support fixtures by electrical connect portions 36*a* at each end thereof.

The halogen type lamp 38, upon insertion into the support fixtures 34, contacts (through its end electrical connect portions 36*a*) contact plates 46. The contact plate 46 on one of the support fixtures 34 is attached to electrical lead 18*a* of the power cord 18 and the contact plate 46 on the other of the support fixtures 34 is attached to electrical lead 18*b* of the power cord. The electrical leads 18*a* and 18*b* are each fed from their respective contact plate 46 to and through the cross-tubular member 44 and thence into the open threaded end 14*a* of the tubular support arm 14 of the lighting device 10.

Assembly of the lighting device 10 of the invention requires initial snap fitment of the cross-tubular pivot member 44 into the tube gripping means of the casing 20 of the head structure 12 of the device 10. The pivot member 44 must be oriented within the gripping means so that the threaded opening at the mid-portion of member 44 faces the central open slot 24*a* of the rear wall 24 of the casing 20 whereby the threaded end portion 14*a* of the support arm 14 may be threaded into the pivot member opening to interconnect the support arm to the pivot arm. Thereafter the power cord leads 18*a* and 18*b* are fed through the support arm 14 and the interconnected cross-tubular pivot member 44 for attachment, respectively, to the contact plates 46 of the ceramic support fixtures 34 affixed to the end walls 32.

With the end walls 32 out of their closure position at the ends of the casing 20, the arcuate metallic reflector unit 40 is positioned in the casing 20 with the front edge of the reflector inserted in groove **28*b* of the front edge section 28 of the casing and the rear edge of the reflector inserted in the groove 30*b* of the rear edge section 30 of the casing. In like fashion the tempered glass shield or lens 42 is positioned in the casing 20 at the lower face of the lighting head structure 12 with the front edge of the lens inserted in groove 28*a* of the front edge section 28 of the casing and the rear edge of the lens inserted in the groove 30*a* of the rear edge section 30 of the casing. Thereafter, a first end wall 32 is affixed to a first end of casing 20 via screw fasteners 31 threaded into the threaded end portions of channels 22*b* and 24*b* of the casing 20**.

With a first end electrical connect portion **36*a* of a halogen lamp 36 inserted into the support fixture 34 of the casing-mounted first end wall 32, the lamp 36 is appropriately aligned within the casing so that upon placement of the second end wall 32 for affixation to the opposing second end of the casing the second end electrical connect portion 36*a* of the lamp becomes inserted into the support fixture 34 mounted to the second end wall. The second end wall 32 is thereafter affixed to the second end of the casing via screw fasteners passing through the second end wall and threaded into the threaded end portions of channels 22*b* and 24*b* of the casing. Alignment of the lamp 36 within the casing 20 during the end wall closure procedure can be accomplished via lamp gripping means inserted into the casing through the support arm slot 24*a* in the rear wall 24 of the casing when the support arm 14 is positioned in its uppermost orientation as shown in FIG. 2**.

As previously indicated, the present invention is directed to an exhibit or display lighting device having a unique lighting head structure which is readily adjustable in its light projection orientation for providing the substantially uniform, spot-free illumination of exhibits and display panel surfaces, exhibited and displayed objects, and work surfaces. In the specification and drawing figures there has been set forth a preferred embodiment of the lighting device of the invention. It is to be understood that modifications of the device may come to mind to those skilled in the lighting fixture art after a reading of the specification and viewing of the drawing figures. Such modifications, including the substitution of materials of construction, are to be considered within the scope of the invention. Although specific terms have been employed-in describing the invention, they are used in a generic and descriptive sense only and not for purposes of limitation, the full scope of the invention being defined in the following claims.

What I claim is:

1. In a pivoted head lighting device for illuminating exhibit and display panels, display objects and work surfaces with a substantially uniform, spot-free spread of light consisting of: an elongated metal shell structure defining a pivoted head lighting device, said shell structure having an upper corner transition section and a lower front opening; a concave metallic light reflector within said shell structure extending over the length thereof; a high intensity electric lamp tube positioned centrally within said shell structure between said reflector and said front opening; a tempered glass lens spanning the front opening of said shell structure; and an elongated support arm pivotally interconnected to said shell structure, the improvement comprising:

a) an integral internally-projecting tube gripping means of semi-circular cross section within said shell structure located within the upper corner transition section and extending along the length thereof, said tube gripping means having an internal semi-circular surface, and b ) a terminal cross-tubular swivel member seated within and held by said gripping means for adjustable rotation therein, said swivel member being interconnected to an end of the support arm of said lighting device, the external diameter of said cross-tubular swivel member and the internal diameter of the semi-circular tube gripping means being substantially equal whereby rotation of said swivel member within said gripping means to position the pivoted head of said lighting device and the light illumination therefrom is only accomplished by overcoming the rotational friction resistance between said swivel member and said gripping means.

2. The pivoted head lighting device for illuminating exhibit and display panels, display objects and work surfaces as claimed in claim 1 wherein the shell structure defining the pivoted head of said lighting device includes a forwardly and downwardly projecting arcuate top wall section from said upper corner transition section and a rearwardly and downwardly projecting arcuate top wall section from said transition section, said forwardly and downwardly projecting top wall section in its free front edge and said rearwardly and downwardly projecting top wall section in its free rear edge defining the lower front opening of said shell structure.

3. The pivoted head lighting device for illuminating exhibit and display panels, display objects and work surfaces as claimed in claim 2 wherein the forwardly and downwardly projecting top wall section of said shell structure includes over its length a series of heat release vents and the rearwardly and downwardly projecting top wall section of said shell structure includes a central slot opening for entry of said support arm for interconnection with said cross-tubular swivel member.

4. The pivoted head lighting device for illuminating exhibit and display panels, display objects and work surfaces as claimed in claim 2 wherein said elongated metal shell structure comprises an aluminum extrusion and the forwardly and downwardly projecting arcuate top wall section and the rearwardly and downwardly projecting arcuate top wall section each bear a first longitudinal inner groove proximate their respective free edges for receiving and supporting the tempered glass lens of said pivoted head lighting device spanning the front opening of said shell structure.

5. The pivoted head lighting device for illuminating exhibit and display panels, display objects and work surfaces as claimed in claim 4 wherein the forwardly and downwardly projecting arcuate top wall section and the rearwardly and downwardly projecting arcuate top wall section of said shell structure each bear a second longitudinal inner groove above the first longitudinal groove of each of said wall sections for receiving and supporting the concave metallic reflector of said pivoted head lighting device within said shell structure.

6. The pivoted head lighting device for illuminating exhibit and display panels, display object and work surfaces as claimed in claim 1 wherein said elongated metal shell structure of said device is provided with removable end wall plates for closing said device and to which are affixed to the inner surface of each of said wall plates an insulating ceramic lamp support fixture for receiving and positioning the high intensity electric lamp tube of said device between said metallic light reflector and said glass lens.

7. In a pivoted head lighting device for illuminating exhibit and display panels, display objects and work surfaces with a substantially uniform, spot-free spread of light consisting of: an elongated extruded metal shell structure having a forwardly and downwardly projecting arcuate top wall section and a rearwardly and downwardly projecting arcuate top wall, said wall sections being joined in an upper corner transition section to define a pivoted head lighting device and said shell structure having a front opening; a high intensity electric lamp tube positioned centrally within said shell structure; an elongated concave metallic light reflector within said shell structure extending over the length thereof and positioned between said lamp tube and said shell structure to reflect light from said lamp tube outwardly through the front opening of said shell structure; a tempered glass lens spanning the front opening of said shell structure; and an elongated support arm pivotally interconnected to said shell structure, the improvement comprising:

a) an integral internally-projecting elongated tube gripping means of semi-circular cross section within said shell structure located within the upper corner transition section and extending along the length thereof, said tube gripping means having an internal semi-circular surface, and b) a terminal cross-tubular swivel member seated within and held by said gripping means for adjustable rotation therein, said swivel member being interconnected to an end of the support arm of said lighting device, the external diameter of said cross-tubular swivel member and the internal diameter of said semi-circular tube gripping means being substantially identical whereby rotation of said cross-tubular member within said gripping means to position the light projecting illumination of said lighting device is only accomplished by overcoming the rotation friction resistance between said member and said means.

8. The pivoted head lighting device for illuminating exhibit and display panels, display objects and work surfaces as claimed in claim 7 wherein the forwardly and downwardly projecting top wall section of said shell structure includes over its length a series of heat release vents and the rearwardly and downwardly projecting top wall section of said shell structure includes a central slot opening for entry of said support arm for interconnection with said cross-tubular swivel member.

9. The pivoted head lighting device for illuminating exhibit and display panels, display objects and work surfaces as claimed in claim 7 wherein said elongated metal shell structure of said device is provided with removable end wall plates for closing said device and to which are affixed to the inner surface of each of said wall plates an insulating ceramic lamp support fixture for receiving and positioning the high intensity electric lamp tube of said device between said metallic light reflector and said glass lens.

* * * * *